United States Patent
Yost

(10) Patent No.: US 7,855,573 B1
(45) Date of Patent: Dec. 21, 2010

(54) CONTROLLER AREA NETWORK ACTIVE BUS TERMINATOR

(75) Inventor: Jerald Wayne Yost, Casstown, OH (US)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 0 days.

(21) Appl. No.: 12/637,333

(22) Filed: Dec. 14, 2009

(51) Int. Cl.
*H03K 17/16* (2006.01)
*H03K 19/003* (2006.01)

(52) U.S. Cl. ............................... 326/30; 326/32; 326/33

(58) Field of Classification Search ........................ None
See application file for complete search history.

(56) References Cited

U.S. PATENT DOCUMENTS

| 5,448,180 | A | 9/1995 | Kienzler et al. |
| 6,587,968 | B1 | 7/2003 | Leyva |
| 6,970,953 | B2 | 11/2005 | Gregory et al. |
| 7,312,628 | B2 | 12/2007 | Houston et al. |
| 7,541,830 | B2 | 6/2009 | Fahrbach et al. |
| 2008/0114920 | A1* | 5/2008 | Watanabe ................... 710/316 |

* cited by examiner

*Primary Examiner*—Anh Q Tran
(74) *Attorney, Agent, or Firm*—Dinsmore & Shohl LLP

(57) ABSTRACT

A terminator for a CAN bus includes an electronic relay and a termination impedance. The electronic relay has first and second control input conductors and switched output conductors. The electrical connection between the switched output conductors is normally closed. The first control input conductor is connected to the power conductor and the second control input conductor is connected to a fifth terminal of the first CAN bus connector. The termination impedance is connected in series at the end node of the CAN bus with the switched output conductors across the high data conductor and the low data conductor. By this arrangement, the termination impedance is effectively connected across the high data conductor and the low data conductor at the end node of the CAN bus until an extension of the CAN bus is plugged into the first CAN bus connector. When an extension of the CAN bus is plugged into the first CAN bus connector, the fifth terminal of the CAN bus connector is connected to the ground conductor. This actuates the relay and opens the switched output conductors.

16 Claims, 4 Drawing Sheets

US 7,855,573 B1

CONTROLLER AREA NETWORK ACTIVE BUS TERMINATOR

STATEMENT REGARDING FEDERALLY SPONSORED RESEARCH OR DEVELOPMENT

Not applicable.

BACKGROUND

The Controller Area Network (CAN) bus format was initially developed to permit a number of separate electronic devices in a vehicle such as an automobile to communicate over a single data bus. Data is transmitted over CAN bus among the various devices, each connected to a node on the bus, with each data message having an identifier which specifies the device to which the message is directed. Since the introduction of the CAN bus in the 1980's, its use has spread beyond automobiles to numerous machine and industrial applications, and a number of variations of the CAN bus format have been adopted. In all of these variations, however, data is transmitted over a single terminated twisted pair cable at a high frequency, on the order of 250 Kbit/sec (ISO11519 or SAE J1939) and up to 1 Mbit/sec (ISO11898). The CAN bus format contemplates a differential signal on the twisted cable pair, with the data signal on one line of the twisted cable pair being a coincident mirror image of the data signal on the other line. In view of the relatively high frequency at which data messages are transmitted, it is necessary to terminate the twisted cable pair at each of its ends with an appropriate impedance to reduce noise and signal reflections that would otherwise degrade system operation.

Because of the flexibility of the CAN bus format, it has become common to use CAN bus extensions. CAN bus extensions can plug into the ends of the main CAN bus of a machine when additional devices are added either temporarily or permanently. When an extension is added, of course, the node which was formerly the end node of the CAN bus becomes an intermediate node. A terminating impedance which was formerly across the twisted cable pair at that node must then be removed, and a proper terminating impedance provided at the end of the CAN bus extension. In the past, terminating impedances were plugged in at the ends of the CAN bus or CAN bus extensions, as needed. Alternatively, terminating impedances were provided at the ends of the CAN bus and extensions, and manually switched across the twisted pair cable when needed. The difficulty with these termination approaches is that they rely on the user remembering to terminate the CAN bus properly. While several automated termination arrangements have been developed, these have tended to be complicated and expensive.

SUMMARY OF THE INVENTION

A data bus arrangement includes a CAN bus having a power conductor, a ground conductor, a high data conductor, and a low data conductor. The CAN bus further includes a first CAN bus connector at the end node of the CAN bus. The first CAN bus connector permits a CAN bus extension to be connected thereto. The power conductor is connected to a first terminal of the first CAN bus connector, the ground conductor is connected to a second terminal of the first CAN bus connector, the high data conductor is connected to a third terminal of the first CAN bus connector, and the low data conductor is connected to a fourth terminal of the first CAN bus connector. An electronic relay has first and second control input conductors and switched output conductors. The electrical connection between the switched output conductors is normally closed. The first control input conductor is connected to the power conductor and the second control input conductor is connected to a fifth terminal of the first CAN bus connector. A termination impedance is connected in series at the end node of the CAN bus with the switched output conductors across the high data conductor and the low data conductor. As a result, the termination impedance is effectively connected across the high data conductor and the low data conductor at the end node of the CAN bus until a CAN bus extension is plugged into the first CAN bus connector. When that occurs, the fifth terminal of the first CAN bus connector is connected to the ground conductor, thereby actuating the relay and opening the switched output conductors.

The electronic relay may comprise a photoMOS relay circuit. The CAN bus extension may have a second CAN bus connector to permit the CAN bus extension to be connected to the CAN bus at the end node. The second CAN bus connector may include a wired electrical connection between the terminal which connects to the second terminal of the first CAN bus connector and the terminal which connects to the fifth terminal of the first CAN bus connector. By this arrangement, connecting the second CAN bus connector to the first CAN bus connector results in actuation of the electronic relay and disconnection of the termination impedance.

A data bus arrangement includes a bus having a power conductor, a ground conductor, a pair of data conductors, and a first bus connector at the end node of the bus. The first bus connector permits a bus extension to be connected to the bus. The power conductor is connected to a first terminal of the first bus connector, the ground conductor is connected to a second terminal of the first bus connector, and the pair of data conductors is connected to third and fourth terminals of the first bus connector. An electronic relay has first and second control input conductors and switched output conductors. The electrical connection between the switched output conductors is normally closed. The first control input conductor is connected to the power conductor and the second control input conductor is connected to a fifth terminal of the first bus connector. A termination impedance is connected in series at the end node of the bus with the switched output conductors across the pair of data conductors. The termination impedance is effectively connected across the data conductors at the end node of the bus until a bus extension is plugged into the first bus connector. When the bus extension is plugged into the first bus connector, the fifth terminal of the first bus connector is connected to the ground conductor, thereby actuating the relay and opening the switched output conductors. The electronic relay may comprise a photoMOS relay circuit. The bus extension has a second bus connector to permit the bus extension to be connected to the bus at the end node. The second bus connector includes a wired electrical connection between the terminal which connects to the second terminal of the first bus connector and the terminal which connects to the fifth terminal of the first bus connector. By this arrangement, connecting the second bus connector to the first bus connector results in actuation of the electronic relay and disconnection of the termination impedance.

A method of providing a terminating impedance at the end node of a CAN bus includes a number of steps. The CAN bus has a power conductor, a ground conductor, a high data conductor, and a low data conductor. The CAN bus further includes a first CAN bus connector at the end node of the CAN bus, permitting a CAN bus extension to be connected thereto. The power conductor is connected to a first terminal of the first CAN bus connector, the ground conductor is connected to a second terminal of the first CAN bus connector, the high data conductor is connected to a third terminal of the first CAN bus connector, and the low data conductor is connected to a fourth terminal of the first CAN bus connector. The method includes the steps of: a.) providing an electronic relay having first and second control input conductors and switched output conductors, the electrical connection between the switched output conductors being normally closed, the first control input conductor being connected to the power conductor and the second control input conductor being connected to a fifth terminal of the first CAN bus connector, b.) providing a termination impedance connected in series at the end node of the CAN bus with the switched output conductors across the high data conductor and the low data conductor, c.) effectively connecting the termination impedance across the high data conductor and the low data conductor at the end node of the CAN bus when a CAN bus extension is not plugged into the first CAN bus connector, and d.) connecting the fifth terminal of the first CAN bus connector to the ground conductor when a CAN bus extension is plugged into the first CAN bus connector, thereby actuating the relay and opening the switched output conductors.

The step of providing an electronic relay may comprise the step of providing a photoMOS relay circuit. The step of connecting the fifth terminal of the first CAN bus connector to the ground conductor may comprise the step of connecting a CAN bus extension to the CAN bus at the end node with a second CAN bus connector. The step of connecting a CAN bus extension to the CAN bus at the end node with a second CAN bus connector may comprise the step of providing a wired electrical connection between the terminal which connects to the second terminal of the first CAN bus connector and the terminal which connects to the fifth terminal of the first CAN bus connector, whereby connecting the second CAN bus connector to the first CAN bus connector results in actuation of the electronic relay and disconnection of the termination impedance.

DETAILED DESCRIPTION OF THE PREFERRED EMBODIMENTS

Figure 1:
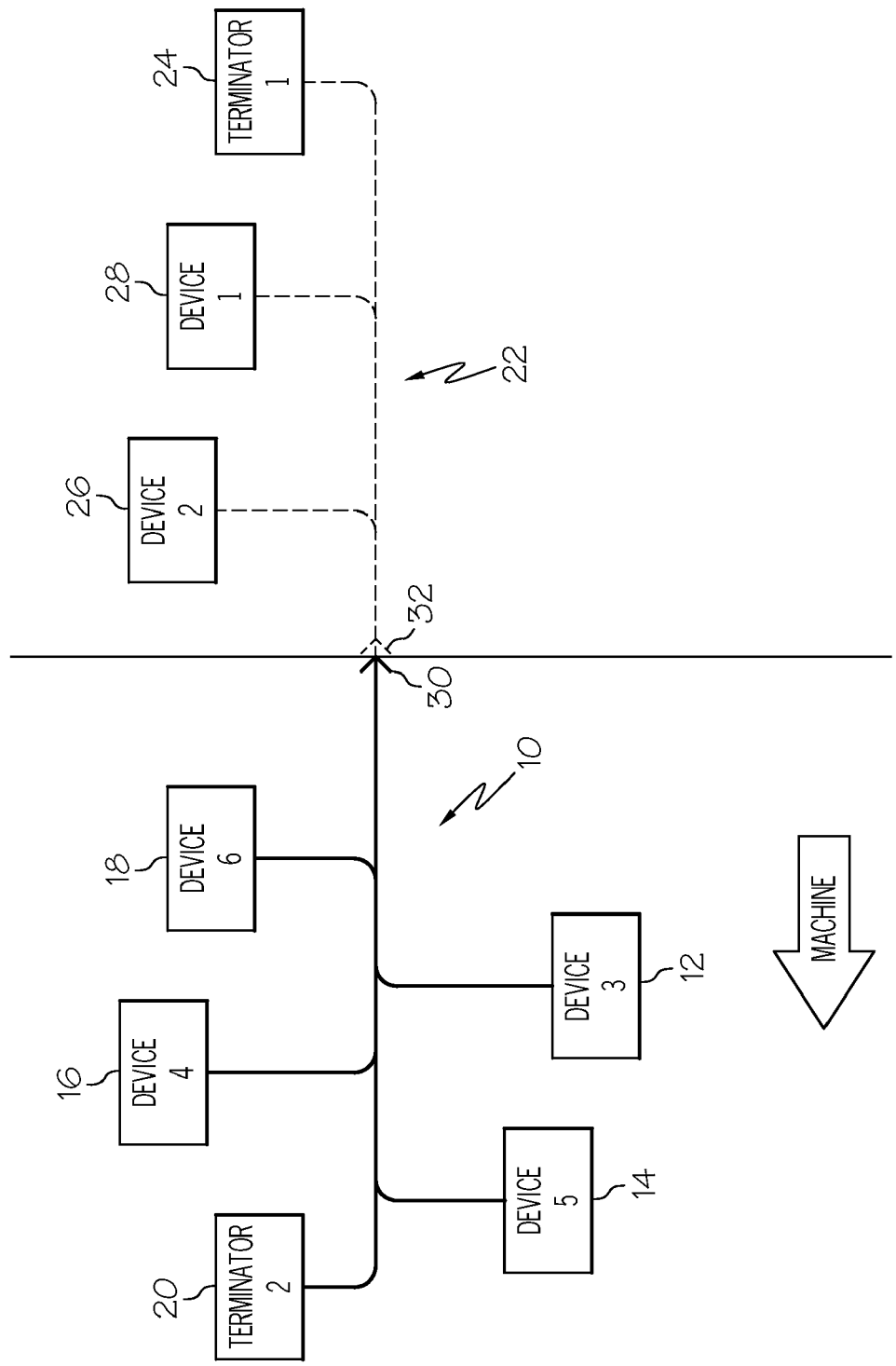
FIG. 1 is a diagrammatic view of a CAN bus system.

FIG. 1 is a diagrammatic representation of a typical CAN bus. As vehicles have become more complex and have incorporated more electronic components, it has become desirable to be able to connect those components together in a way that allows them to communicate with each other. The Controller Area Network (CAN) bus 10 was developed to meet this need. The BUS consists of a two-wire arrangement for transmission of data among devices 12, 14, 16, and 18. Although only four devices are shown, a typical application may include dozens of such devices, and perhaps even more. The data rates on the CAN bus can range from less than 10,000 bits/sec to 1,000,000 bits/sec, with the most common data transfer speed being approximately 250,000 bits/sec. It will be appreciated that as the data transmission rate over a pair of wires increases, electrical transmission line effects can become significant. To ameliorate these effects, the two wires carrying the data are twisted, optionally shielded, and terminated with an impedance that is the equivalent to the characteristic impedance of the network cables. Manufacturers have typically terminated a CAN bus by hardwiring terminating impedances into the end nodes of the bus. Such terminating impedances are required at both ends of the bus. However, a problem develops when a second CAN bus, such as CAN bus extension 22, is plugged into the CAN bus 10 at one end of the bus. The terminating impedance that was formerly located at that end of the bus 10 is no longer located at the end of the bus defined by the combined, extended CAN bus cable. As shown in FIG. 1, an additional terminating impedance 24 must be connected at the end of the extension 22, beyond the additional devices 26 and 28. Further, an impedance which was formerly at the end of the CAN bus 10, at the CAN bus connector must be removed before the connector 32 is plugged into connector 30 to join the CAN bus 10 to the CAN bus extension 22.

Figure 2:
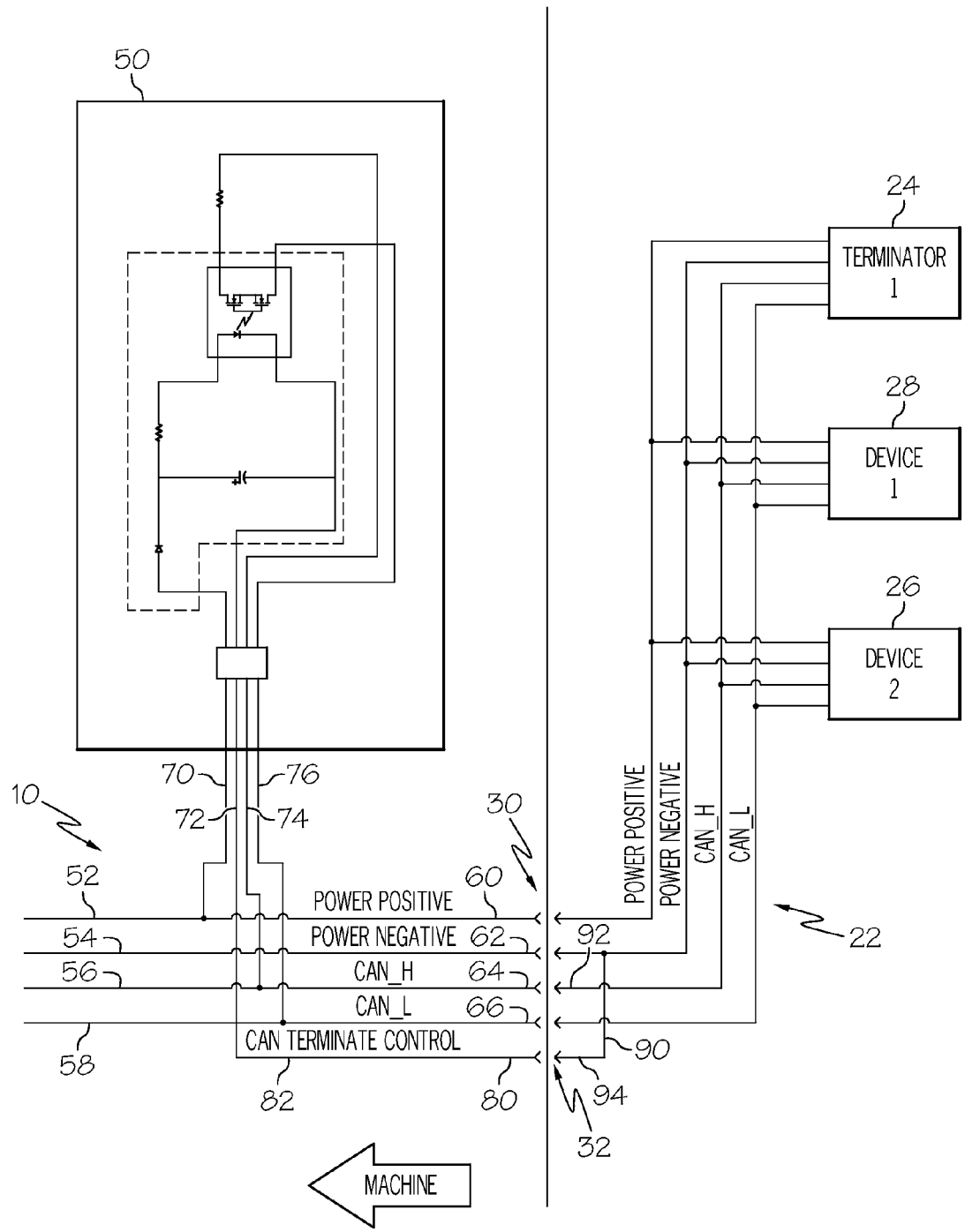
FIG. 2 is a diagrammatic view, showing a portion of a CAN bus system and the connection of an embodiment of the terminator for the CAN bus.
Figure 4:
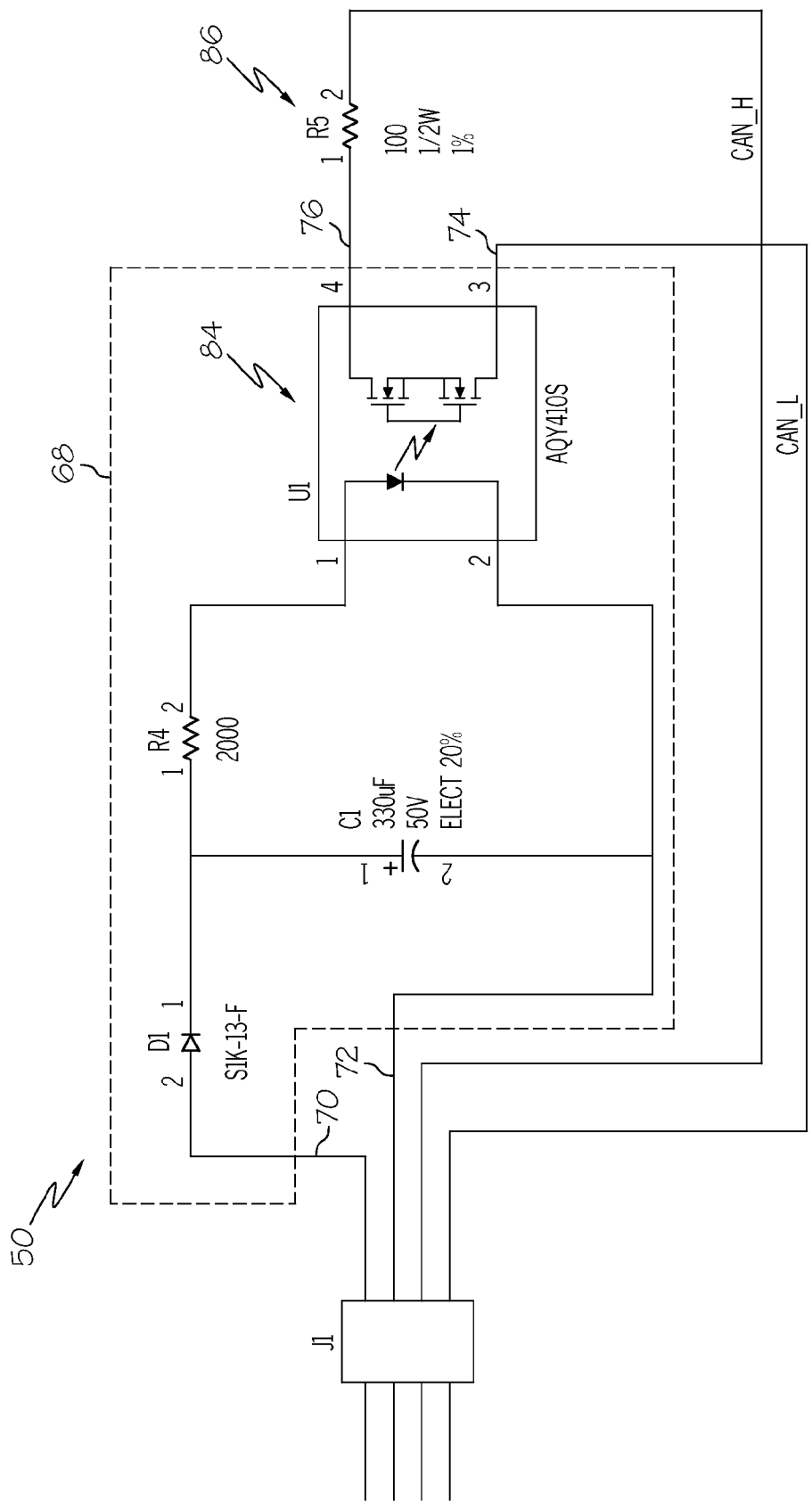
FIG. 4 is an electrical schematic diagram of an embodiment of the terminator for the CAN bus.

FIGS. 4 and 2 depict an embodiment of the terminator which appropriately terminates the CAN bus, as needed, and the manner in which it is connected into the CAN bus, respectively. The CAN bus 10 includes a power conductor 52, a ground conductor 54, a high data conductor 56, and a low data conductor 58. The CAN bus 10 further includes a first CAN bus connector 30 at the end node of the CAN bus 10. Connector 30 permits another CAN bus to be connected to the CAN bus 10. The power conductor 52 is connected to a first terminal 60 of the first CAN bus connector 30. The ground conductor 54 is connected to a second terminal 62 of the first CAN bus connector 30. The high data conductor 56 is connected to a third terminal 64 of the first CAN bus connector 30, and the low data conductor 58 is connected to a fourth terminal 66 of the first CAN bus connector 30.

The terminator 50 includes an electronic relay 68 having first and second control input conductors 70 and 72, and switched output conductors 74 and 76. The electrical connection between the switched output conductors 74 and 76 is normally closed. As seen in FIG. 2, the first control input conductor 70 is connected to the power conductor 54, the second control input conductor 72 is connected to a fifth terminal 80 of the first CAN bus connector 30 via conductor 82. The electronic relay 68 includes a photoMOS relay circuit 84. A termination impedance 86 is connected in series at the end node of the CAN bus 10 with the switched output conductors 74 and 76 across the high data conductor 56 and the low data conductor 58. As a result, the termination impedance 86 is effectively connected across the high data conductor and the low data conductor at the end node of the CAN bus 10 until an extension 22 of the CAN bus is plugged into the first CAN bus connector 30. When an extension 22 of the CAN bus is plugged into the first CAN bus connector 30, the fifth terminal 80 of the CAN bus connector 30 is connected to the ground conductor 54, thereby actuating the relay 68 and opening the switched output conductors 74 and 76. As a consequence, the impedance 86 is no longer connected across conductors 54 and 56. The extension has a terminator 24 at its opposite end, thus providing proper termination impedance for the CAN bus 10 and the extension 22. The terminator 24 may be a circuit identical to terminator 50, or it may simply be an impedance appropriately connected in the event that no additional extensions are to be plugged into extension 22.

The CAN bus extension 22 has a second CAN bus connector 32 to permit the CAN bus extension 22 to be connected to the CAN bus 10 at the end node. The second CAN bus connector 32 includes a wired electrical connection 90 between the terminal 92 which connects to the second terminal 62 of the first CAN bus connector 30 and the terminal 94 which connects to the fifth terminal 80 of the first CAN bus connector 30. As a result, connecting the second CAN bus connector 32 to the first CAN bus connector 30 results in actuation of the electronic relay 68 and disconnection of the termination impedance 86.

Figure 3:
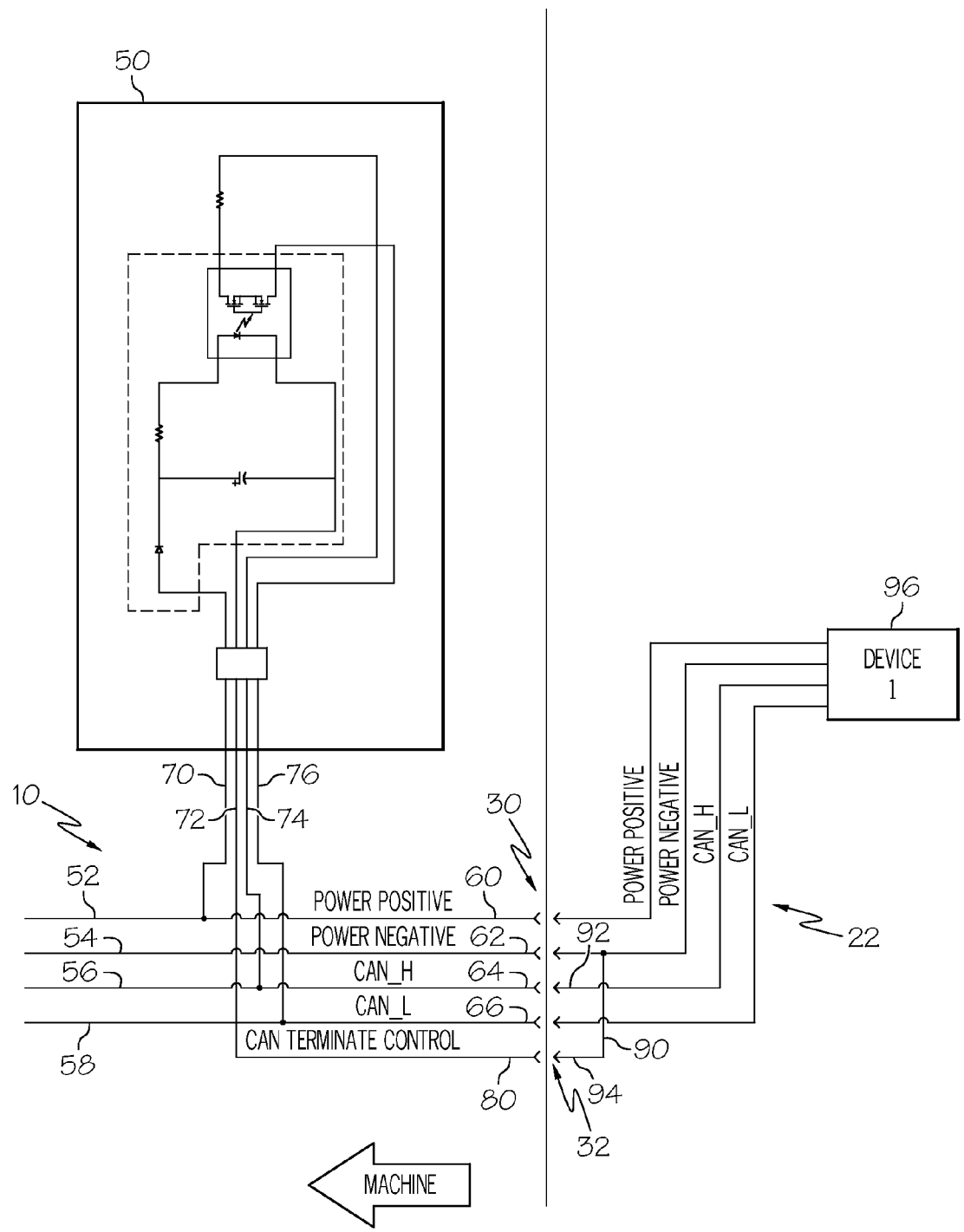
FIG. 3 is a view, similar to FIG. 2, showing a single device plugged into the CAN bus.

It will be appreciated that the CAN bus extension 22 may attach only one additional device, such as device 96 as shown in FIG. 3. In such a case, the device 96 may include an appropriate termination impedance.

What is claimed is:

1. A terminator for a CAN bus, said CAN bus including a power conductor, a ground conductor, a high data conductor, and a low data conductor, said CAN bus further including a first CAN bus connector at the end node of the CAN bus, permitting another CAN bus to be connected thereto, said power conductor connected to a first terminal of said first CAN bus connector, said ground conductor connected to a second terminal of said first CAN bus connector, said high data conductor connected to a third terminal of said first CAN bus connector, and said low data conductor connected to a fourth terminal of said first CAN bus connector, comprising:
   an electronic relay having first and second control input conductors and switched output conductors, the electrical connection between said switched output conductors being normally closed, said first control input conductor being connected to said power conductor and said second control input conductor being connected to a fifth terminal of said first CAN bus connector, and
   a termination impedance connected in series at the end node of the CAN bus with said switched output conductors across said high data conductor and said low data conductor, whereby said termination impedance is effectively connected across said high data conductor and said low data conductor at the end node of the CAN bus until an extension of said CAN bus is plugged into said first CAN bus connector, and whereby when an extension of said CAN bus is plugged into said first CAN bus connector, said fifth terminal of said CAN bus connector is connected to said ground conductor, thereby actuating said relay and opening said switched output conductors.

2. The terminator for a CAN bus according to claim 1, in which said electronic relay comprises a photoMOS relay circuit.

3. The terminator for a CAN bus according to claim 1, further comprising a CAN bus extension, said CAN bus extension having a second CAN bus connector to permit said CAN bus extension to be connected to said CAN bus at said end node.

4. The terminator for a CAN bus according to claim 3, in which said second CAN bus connector includes a wired electrical connection between the terminal which connects to said second terminal of said first CAN bus connector and the terminal which connects to said fifth terminal of said first CAN bus connector, whereby connecting said second CAN bus connector to said first CAN bus connector results in actuation of said electronic relay and disconnection of said termination impedance.

5. A data bus arrangement, comprising:
   a CAN bus, said CAN bus including a power conductor, a ground conductor, a high data conductor, and a low data conductor, said CAN bus further including a first CAN bus connector at the end node of the CAN bus permitting a CAN bus extension to be connected thereto, said power conductor connected to a first terminal of said first CAN bus connector, said ground conductor connected to a second terminal of said first CAN bus connector, said high data conductor connected to a third terminal of said first CAN bus connector, and said low data conductor connected to a fourth terminal of said first CAN bus connector,
   an electronic relay having first and second control input conductors and switched output conductors, the electrical connection between said switched output conductors being normally closed, said first control input conductor being connected to said power conductor and said second control input conductor being connected to a fifth terminal of said first CAN bus connector, and
   a termination impedance connected in series at the end node of the CAN bus with said switched output conductors across said high data conductor and said low data conductor, whereby said termination impedance is effectively connected across said high data conductor and said low data conductor at the end node of the CAN bus until a CAN bus extension is plugged into said first CAN bus connector, and whereby when said CAN bus extension is plugged into said first CAN bus connector, said fifth terminal of said first CAN bus connector is connected to said ground conductor, thereby actuating said relay and opening said switched output conductors.

6. The data bus arrangement of claim 5, in which said electronic relay comprises a photoMOS relay circuit.

7. The data bus arrangement of claim 5, further comprising a CAN bus extension, said CAN bus extension having a second CAN bus connector to permit said CAN bus extension to be connected to said CAN bus at said end node.

8. The data bus arrangement of claim 7, in which said second CAN bus connector includes a wired electrical connection between the terminal which connects to said second terminal of said first CAN bus connector and the terminal which connects to said fifth terminal of said first CAN bus connector, whereby connecting said second CAN bus connector to said first CAN bus connector results in actuation of said electronic relay and disconnection of said termination impedance.

9. A data bus arrangement, comprising:
   a bus including a power conductor, a ground conductor, a pair of data conductors, said bus further including a first bus connector at the end node of the bus permitting a bus extension to be connected thereto, said power conductor connected to a first terminal of said first bus connector, said ground conductor connected to a second terminal of said first bus connector, and said pair of data conductors connected to third and fourth terminals of said first bus connector,
   an electronic relay having first and second control input conductors and switched output conductors, the electrical connection between said switched output conductors being normally closed, said first control input conductor being connected to said power conductor and said second control input conductor being connected to a fifth terminal of said first bus connector, and
   a termination impedance connected in series at the end node of the bus with said switched output conductors across said pair of data conductors, whereby said termination impedance is effectively connected across said data conductors at the end node of the bus until a bus extension is plugged into said first bus connector, and whereby when said bus extension is plugged into said first bus connector, said fifth terminal of said first bus connector is connected to said ground conductor, thereby actuating said relay and opening said switched output conductors.

10. The data bus arrangement of claim 9, in which said electronic relay comprises a photoMOS relay circuit.

11. The data bus arrangement of claim 9, further comprising a bus extension, said bus extension having a second bus connector to permit said bus extension to be connected to said bus at said end node.

12. The data bus arrangement of claim 11, in which said second bus connector includes a wired electrical connection between the terminal which connects to said second terminal of said first bus connector and the terminal which connects to said fifth terminal of said first bus connector, whereby connecting said second bus connector to said first bus connector results in actuation of said electronic relay and disconnection of said termination impedance.

13. A method of providing a terminating impedance at the end node of a CAN bus, said CAN bus including a power conductor, a ground conductor, a high data conductor, and a low data conductor, said CAN bus further including a first CAN bus connector at the end node of the CAN bus permitting a CAN bus extension to be connected thereto, said power conductor connected to a first terminal of said first CAN bus connector, said ground conductor connected to a second terminal of said first CAN bus connector, said high data conductor connected to a third terminal of said first CAN bus connector, and said low data conductor connected to a fourth terminal of said first CAN bus connector, comprising the steps of:

providing an electronic relay having first and second control input conductors and switched output conductors, the electrical connection between said switched output conductors being normally closed, said first control input conductor being connected to said power conductor and said second control input conductor being connected to a fifth terminal of said first CAN bus connector, providing a termination impedance connected in series at the end node of the CAN bus with said switched output conductors across said high data conductor and said low data conductor, effectively connecting said termination impedance across said high data conductor and said low data conductor at the end node of the CAN bus when a CAN bus extension is not plugged into said first CAN bus connector, and connecting said fifth terminal of said first CAN bus connector to said ground conductor when a CAN bus extension is plugged into said first CAN bus connector, thereby actuating said relay and opening said switched output conductors.

14. The method of providing a terminating impedance at the end node of a CAN bus according to claim 13, in which the step of providing an electronic relay comprises the step of providing a photoMOS relay circuit.

15. The method of providing a terminating impedance at the end node of a CAN bus according to claim 13, in which the step of connecting said fifth terminal of said first CAN bus connector to said ground conductor comprises the step of connecting a CAN bus extension to said CAN bus at said end node with a second CAN bus connector.

16. The method of providing a terminating impedance at the end node of a CAN bus according to claim 15, in which the step of connecting a CAN bus extension to said CAN bus at said end node with a second CAN bus connector comprises the step of providing a wired electrical connection between the terminal which connects to said second terminal of said first CAN bus connector and the terminal which connects to said fifth terminal of said first CAN bus connector, whereby connecting said second CAN bus connector to said first CAN bus connector results in actuation of said electronic relay and disconnection of said termination impedance.

\* \* \* \* \*